(12) United States Patent
Kirby

(10) Patent No.: US 6,488,797 B1
(45) Date of Patent: Dec. 3, 2002

(54) FIRST STAGE RUN FLAT TIRE BUILDING DRUM AND METHOD OF USING SAME

(75) Inventor: James M. Kirby, Akron, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/570,083

(22) Filed: May 12, 2000

(51) Int. Cl.$^7$ .............................. B29D 30/26
(52) U.S. Cl. .................. 156/131; 152/517; 156/133; 156/414; 156/417
(58) Field of Search ............... 156/414, 415, 156/416, 417, 418, 419, 420, 130.7, 131, 123, 133; 152/516, 517, 555

(56) References Cited

U.S. PATENT DOCUMENTS

| | | |
|---|---|---|
| 607,991 A | 7/1898 | Guthrie |
| 3,154,455 A | 10/1964 | Nebout |
| 3,402,090 A | 9/1968 | Henley ...................... 156/398 |
| 3,556,891 A | 1/1971 | Martinkovic et al. ....... 156/132 |
| 3,813,271 A | 5/1974 | Riggs ......................... 156/417 |
| 3,915,788 A | 10/1975 | Hirata et al. ................ 156/403 |
| 3,963,394 A | 6/1976 | Shichman et al. ............ 425/51 |
| 4,108,707 A | 8/1978 | Appleby et al. ............ 156/397 |
| 4,151,035 A | 4/1979 | Jellison ...................... 156/415 |
| 4,152,191 A | 5/1979 | Olsen ......................... 156/414 |
| 4,220,494 A * | 9/1980 | Kawaida et al. ............ 156/415 |
| 4,229,246 A | 10/1980 | Vanderzee ................... 156/417 |
| 4,263,083 A | 4/1981 | Schleiger .................... 156/414 |
| 4,274,899 A | 6/1981 | Duttlinger ............... 156/123 R |
| 4,278,484 A | 7/1981 | McGaughey ................ 156/123 |
| 4,325,764 A | 4/1982 | Appleby et al. ......... 156/123 R |
| 4,402,783 A | 9/1983 | Enders ........................ 156/415 |
| 4,437,920 A | 3/1984 | Kubo ...................... 156/406.2 |
| 4,472,233 A | 9/1984 | Fukamachi et al. .......... 156/415 |
| 4,510,002 A | 4/1985 | Goodfellow ................. 156/126 |
| 4,859,272 A | 8/1989 | Lovell et al. |
| 5,116,449 A | 5/1992 | Fabris et al. ................. 156/415 |
| 5,215,612 A | 6/1993 | Motomura et al. ....... 156/130.7 |
| 5,254,204 A | 10/1993 | Miyanaga et al. ........... 156/401 |
| 5,268,057 A | 12/1993 | Nojivi et al. ................ 156/415 |
| 5,380,384 A | 1/1995 | Tokunaga et al. ............ 156/111 |
| 5,591,288 A | 1/1997 | Becker et al. ............ 156/130.1 |
| 6,022,434 A | 2/2000 | Snipes |

FOREIGN PATENT DOCUMENTS

| | | |
|---|---|---|
| DE | 166 792 C | 1/1904 |
| GB | 20952 | 10/1900 |
| RU | 2011534 | 4/1994 |
| SU | 1717402 A2 | 3/1992 |
| WO | WO 98 54008 A | 12/1998 |

\* cited by examiner

Primary Examiner—Geoffrey L. Knable
(74) Attorney, Agent, or Firm—John M. Vasuta; Michael Sand

(57) ABSTRACT

A first stage tire building drum for building a run flat tire has a cylindrical central portion for receiving the strip components thereon for fabricating a first stage body ply carcass and has a pair of bead receiving areas adjacent the central portion for receiving bead rings thereon. The central portion and bead areas preferably are formed by a plurality of moveable arcuate segments. A spacer or sleeve is formed by a plurality of arcuate segments and is mounted on the center of the cylindrical drum portion and forms a pair of adjacent recesses. The spacer has a smooth outer cylindrical surface. The spacer has a height equal to the thickness of run flat tire sidewall inserts and a width equal to the distance between the inside edges of the opposed sidewall inserts. The elastomeric inserts are placed in the recesses adjacent the central spacer, and in combination with smooth outer surface of the spacer, provide a substantially smooth continuous flat surface for receiving the various tire components thereon without interruption.

17 Claims, 4 Drawing Sheets

FIRST STAGE RUN FLAT TIRE BUILDING DRUM AND METHOD OF USING SAME

BACKGROUND OF THE INVENTION

1. Technical Field

The invention relates to tire building drums, and more particularly, to a first stage tire building drum for run flat tires having a central spacer which forms a pair of adjacent recesses for accommodating elastomeric inserts which form the elastomeric crescent shaped inserts in the sidewalls of run flat tires.

2. Background Information

Various tire constructions have been devised over the years which enable a tire to run in an under-inflated or non-inflated condition, such as after receiving a puncture and loss of pressurized air, for extended periods of time and at relatively high speeds. This enables the vehicle operator to safely drive the vehicle to an appropriate location for repair or replacement of the punctured tire. Certain of these safety tires, referred to as "run flat tires", have been successful for certain applications and certain types of tire constructions. Most of these run flat tires achieve their run flat capability, by the placement of reinforcing layers or crescent shaped members of a relatively stiff elastomeric material in the side walls of the tire which enable the tire to support the vehicle weight even with the complete loss of internal air pressure. Examples of such sidewall inserts are shown in U.S. Pat. Nos. 3,911,987; 3,949,798; 3,954,131; 4,067,372; 4,202,393; 4,203,481; 4,261,405; 4,265,288; 4,287,924; 4,365,659; 4,917,164; and 4,929,684.

However, problems develop when manufacturing such run flat tires having the sidewall inserts when using usual fabrication equipment and techniques due to the extreme care that must be taken to prevent air from being trapped between the uncured tire components and the creating of undesirable bulges and projections in the tire, without excessively increasing the cost of tire manufacture. This problem was recognized and was attempted to be solved by the forming of spaced depressions, in a specially constructed tire building drum for receiving the uncured material to form the sidewall inserts as shown in U.S. Pat. No. 5,591,288. However, this required constructing a special drum for receiving the rubber inserts and is limited to a particular size of tire produced thereby due to the size and location of the recesses in which the inserts are installed. Also, if the inserts are wider than the grooves they may ride out of the grooves creating a uniformity problem.

SUMMARY OF THE INVENTION

The present invention provides a first stage run flat tire building drum and method using a spacer or sleeve mounted on the center of a usual tire building drum, wherein the spacer has a width the same as the distance between the inside edges of the inbound and outbound sidewall rubber inserts of a run flat tire and a height equal to that of the rubber insert at its thickest point.

The tire building drum of the present invention enables the building of a uniform first stage tire carcass free of interruptions from the sidewall inserts and which provides a relatively smooth body contour for receiving the other tire components.

The tire building drum of the invention enables the inner liner to be placed radially inwardly or outwardly of the sidewall inserts without changing the structure of the tire building drum and without special assembly procedures.

Another aspect of the invention includes forming the spacer sleeve in same number of arcuate segments as is the expandable tire building drum so as to be compatible therewith, and in which the spacer segments can be formed of a rigid, lightweight material such as polyurethane.

Another feature of the invention is to provide building the first stage body ply without trapping air between the plies and inserts and without bumps or protrusions being formed thereby.

A further advantage of the invention is to enable a usual first stage tire building drum to be usable for building various sizes of run flat tires, having various size sidewall inserts, by changing the axial length and height of the spacer sleeve placed on the tire building drum, and without changing the method of manufacture of the first stage body ply carcass.

The foregoing advantages, construction and operation of the present invention will become more readily apparent from the following description and accompanying drawings.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts through the drawings.

DESCRIPTION OF THE PREFERRED EMBODIMENTS

Figure 1:
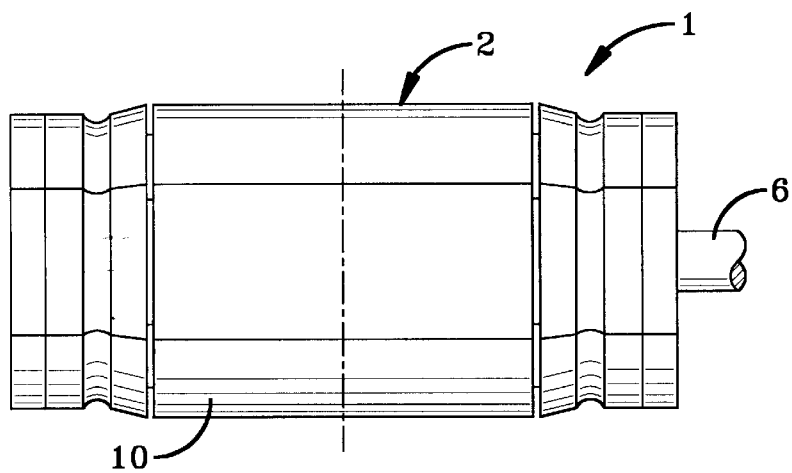
FIG. 1 is a generally diagrammatic elevational view of a prior art first stage tire building drum in a collapsed position.
Figure 2:
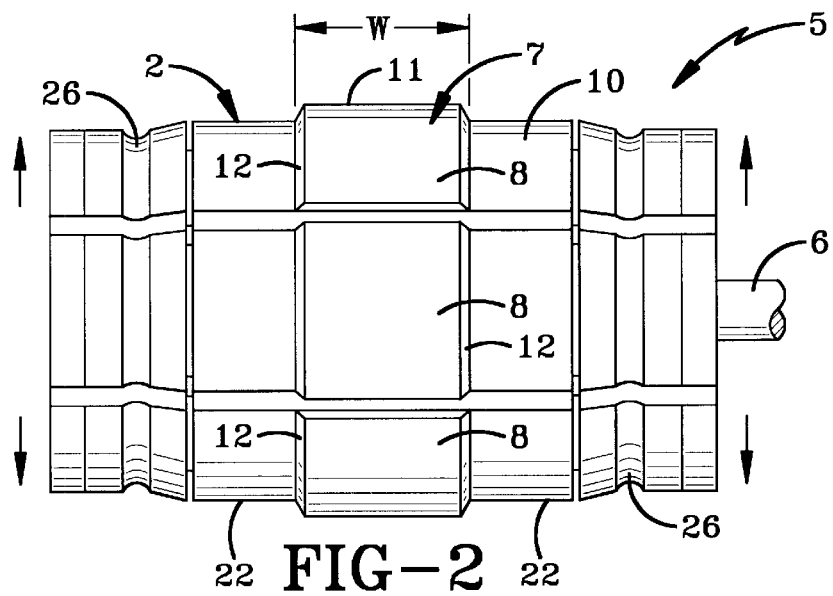
FIG. 2 is a diagrammatic elevational view similar to FIG. 1 of the improved tire building drum having a central spacer mounted thereon with the drum and spacer in an expanded position.

FIG. 1 is a generally diagrammatic view of a usual prior art first stage tire building drum indicated generally at 1. Drum 1 is formed by a plurality of arcuate segments 2, six of which are shown for the particular construction of drum 1 of FIG. 1, which are connected by various well known types of linkage means (not shown), which enable the segments to be expanded outwardly from the contracted position of FIG. 1 to an expandable position as shown in FIG. 2. The particular construction of the drum segments, linkages and expansion mechanisms, as well as the bead ring clamping mechanism, are well known in the art and thus are not further described in detail. Prior art examples of tire building drums in which the present invention can be incorporated are shown in U.S. Pat. Nos. 4,402,783; 5,591,288; 4,229,246; 3,915,788; 4,108,707; 4,278,484; and 5,308,384.

The tire building drum of the present invention is indicated generally at 5, and is shown in FIGS. 2–6. Drum 5 is similar to prior art drum 1 discussed above, in that it has a plurality of the same expandable segments 2 and is rotated by a usual shaft 6, and has an appropriate expansion mechanism and linkages, as shown diagrammatically by rod 3 and connector block 4 (FIG. 5), for expanding the drum from the contracted position of FIG. 1 to an expanded position shown in FIG. 2.

In accordance with the invention, a spacer indicated generally at 7, is located at the centerline 8 of the building drum. In the particular embodiment shown in the drawings, spacer 7 is comprised of six, preferably equal arcuate segments 8, which collectively form spacer 7. Segments 8 can be formed of various metals or of a plastic material such as a polyurethane, enabling the same to be easily machined or molded. Segments 8 can be fixed onto the plurality of drum segments 2 which collectively form a smooth, cylindrical central portion 10 of the drum, by various types of fasteners such as bolts 9 (FIG. 5), or by an adhesive or other type of fasteners, in order to be in a fixed position on each of the arcuate segments 2. Each arcuate segment 8 includes a smooth, curved outer surface 11 which terminates in a pair of tapered arcuate edges 12. Spacer 7, and in particular, arcuate segments 8, will have a height T (FIG. 5), which will be generally equal to the maximum thickness of elastomeric sidewall inserts 15 as shown particularly in FIGS. 3, 4 and 6. The axial length or width W of spacer 7 will be the distance D (FIGS. 7 and 8) between the inside edges 16 of the inboard and outboard sidewall inserts 15 when incorporated into the sidewalls 18 of a usual pneumatic tire 20. In accordance with one of the main features of the invention spacer 7 forms a pair of adjacent cylindrical recessed areas 22 extending about drum 5 having a depth equal to height T of spacer 7.

Figure 3:
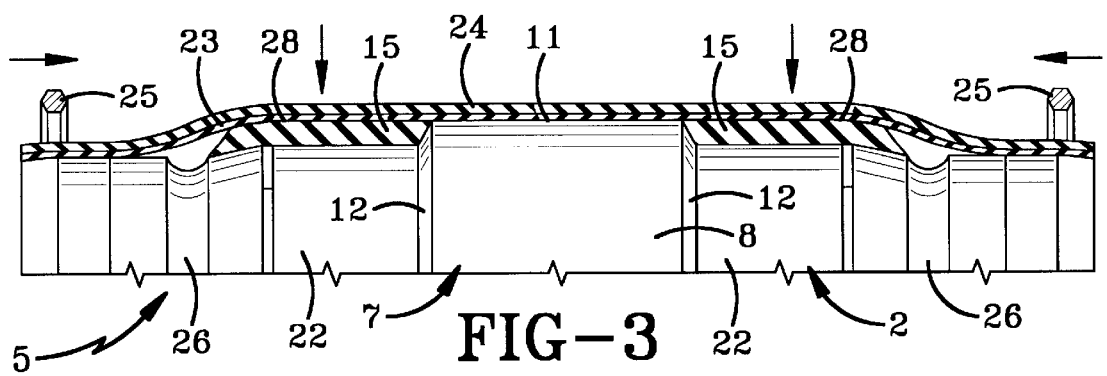
FIG. 3 is an enlarged fragmentary view of the tire building drum of FIG. 2 with the run flat tire insert segments, innerliner and body ply placed thereon and shown in section.
Figure 4:
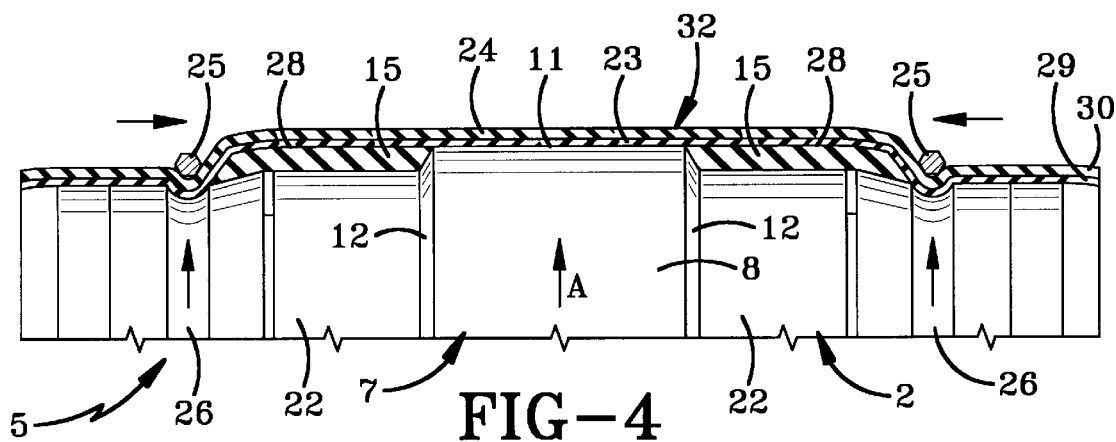
FIG. 4 is a view similar to FIG. 3 showing the tire building drum and spacer in expanded position with the beads placed thereon.
Figure 5:
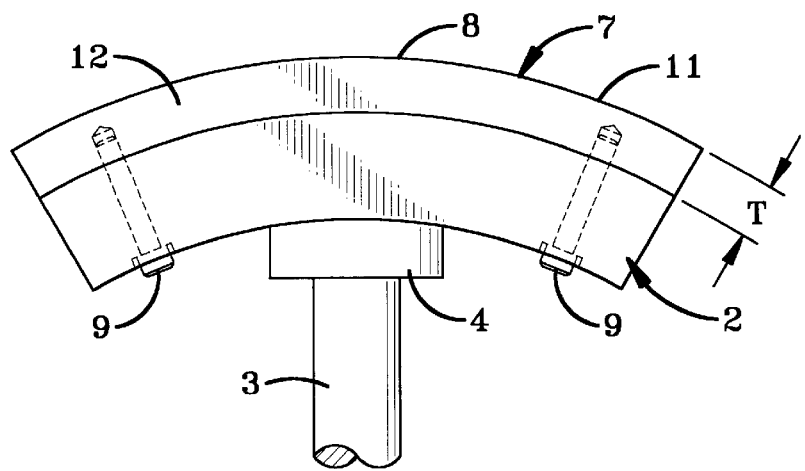
FIG. 5 is a diagrammatic end elevational view of one of the tire building drum segments and spacer segments removed from the tire building drum of FIG. 2.
Figure 7:
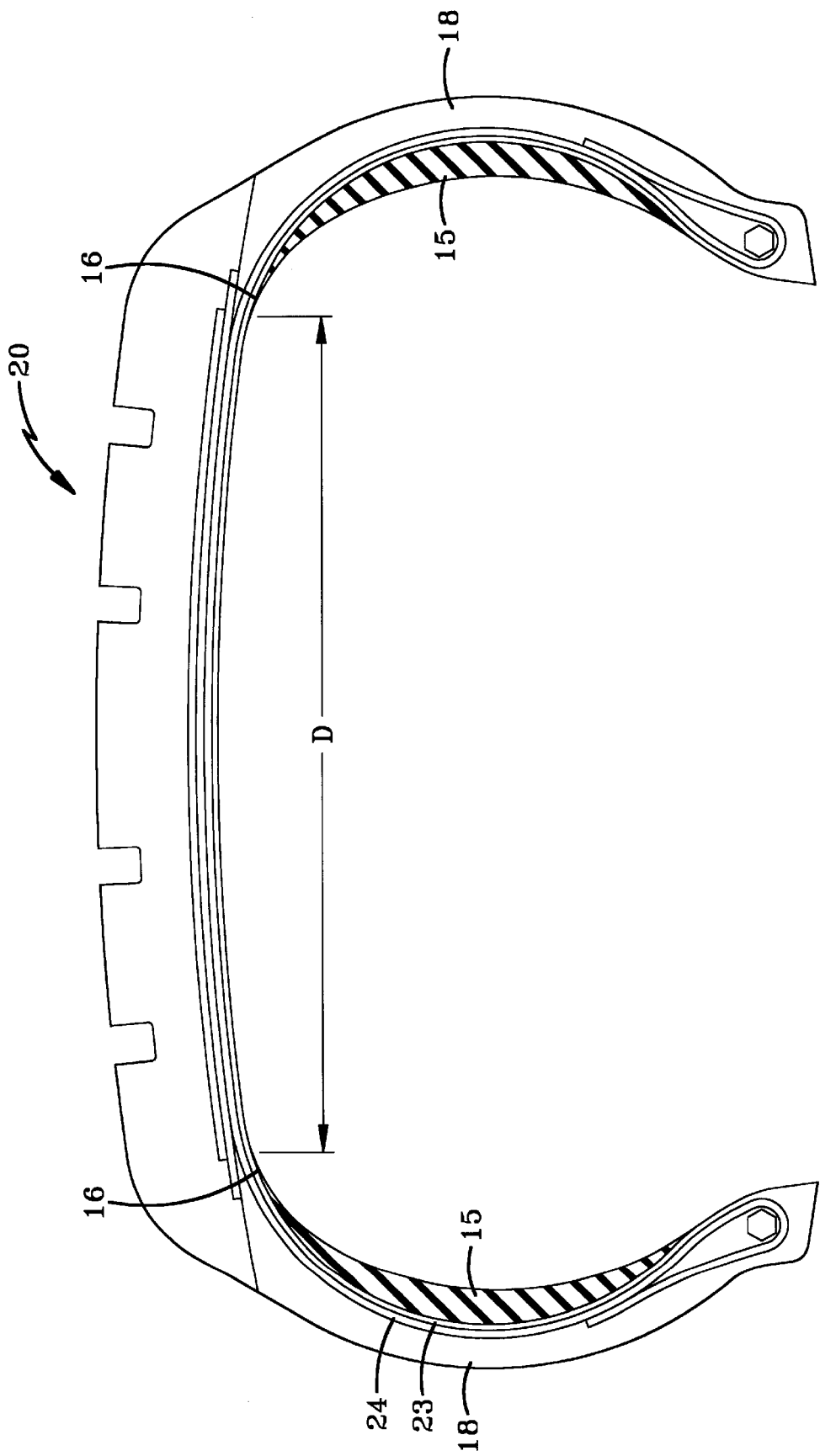
FIG. 7 is a sectional view of a run flat tire produced by the tire building drum and tire carcass shown in FIG. 3.
Figure 8:
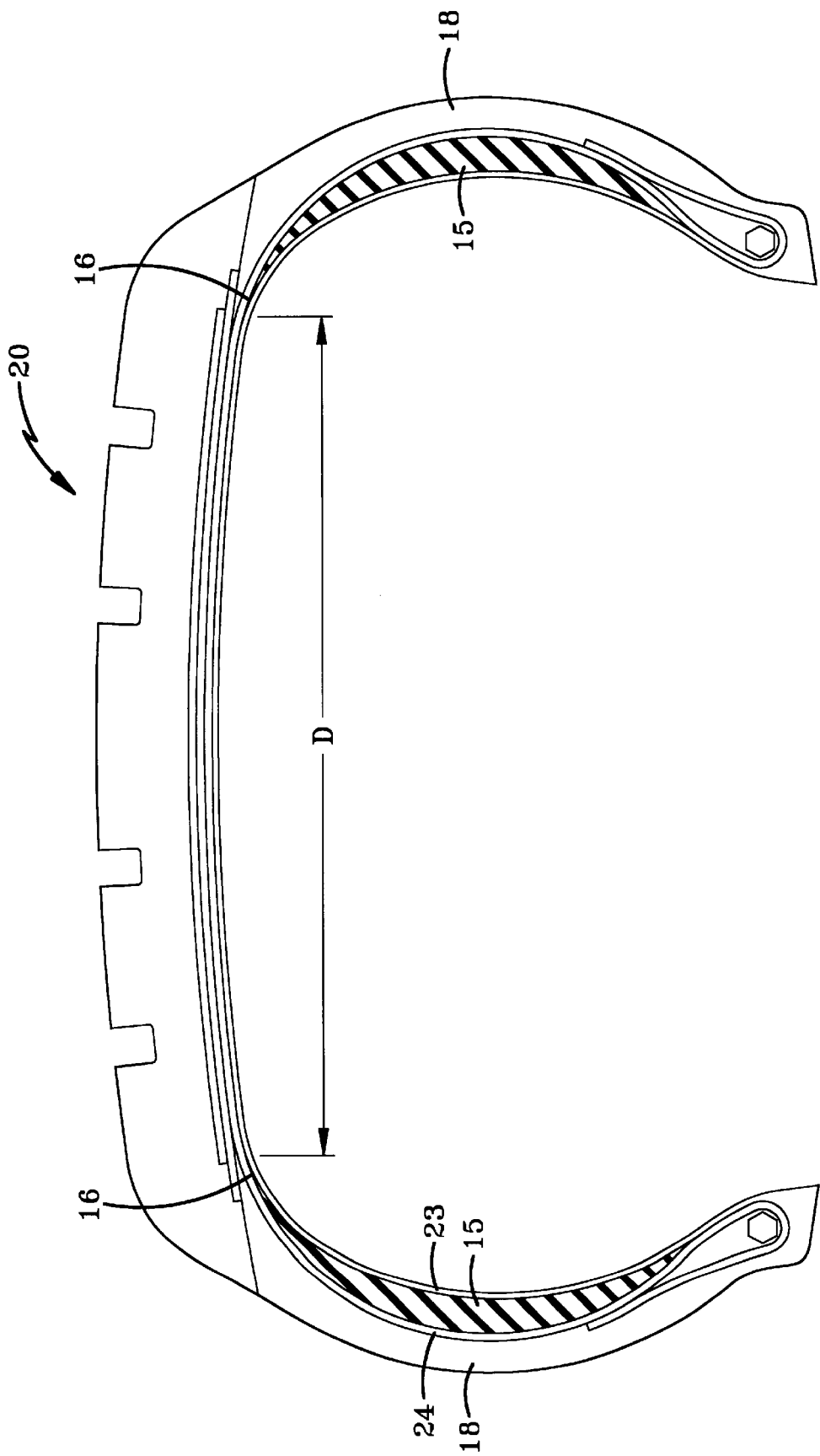
FIG. 8 is a sectional view of a run flat tire with the tire carcass arrangement shown in FIG. 6.

FIG. 3 shows the use of drum 5 to form a first stage tire carcass. A pair of sidewall inserts 15 are placed in recessed areas 22 and extend axially therealong from tapered edges 12 and circumferentially about the drum. Inserts 15 form the pair of spaced crescent-shaped annular sidewall reinforcement in the final tire as shown in FIGS. 7 and 8. Next, an air impervious innerliner 23 is placed in the usual manner about the drum and will extend generally along a predetermined axial length of the drum. Next, a first body ply 24, which will usually contain reinforcing cords, is placed about innerliner 23. Additional body plies can be placed over innerliner 23 if desired, although, only one is shown in FIGS. 3 and 4. Next, bead rings 25 will be moved axially inward along and about drum 5, ultimately being positioned above U-shaped annular grooves 26 which form bead receiving recesses. After the above described tire components are in position on drum 5, as shown in FIG. 3, the drum segments are expanded outwardly as shown by arrows A FIG. 4 bringing the components into tight engagement with each other and securely trapping beads rings 25 within grooves 26, as shown particularly in FIG. 4.

The top surfaces 28 of elastomeric inserts 15 lie in a substantially flat common plane when viewed in cross section, with the smooth top surface 11 of spacer 7. This provides for a relatively smooth, continuous, flat annular surface extending about the drum between bead rings 25 which prevents the formation of spaces between the various components and in particular with the sidewall inserts which heretofore trapped air which cause problems during vulcanization. The outer ends 29 and 30 of innerliner 23 and body ply 24 respectively, are then turned up about bead rings 25 in a well known tire forming operation. The drum is then retracted to a collapsed position and this first body ply carcass indicated at 32, is then removed from the drum for further incorporation into a final tire construction at a second stage tire building drum.

Thus, in order to form first body ply carcass 32, the main difference from a usual tire building procedure is the placement of inserts 15 in recessed areas 22 which provides the generally smooth, continuous, flat body ply layup surface extending along the majority of the axial drum length and circumferentially about the drum.

Figure 6:
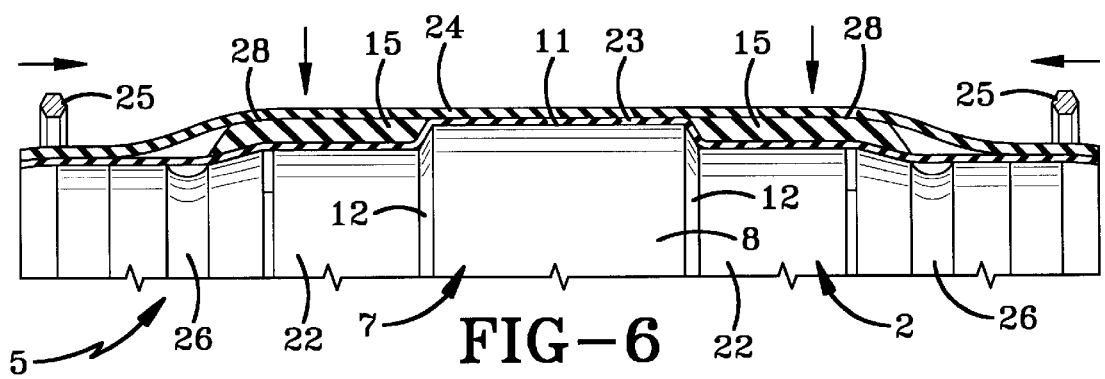
FIG. 6 is a view similar to FIG. 3 showing a modified arrangement of the insert segments, innerliner and first body ply placed on the tire building drum.

FIG. 6 shows a slightly modified method of forming a first stage body ply carcass which involves placing innerliner 23 on the drum building surface prior to the placement of elastomeric inserts 15 in recessed areas 22. The thickness of innerliner 23 is so slight that is still enables the top surfaces 28 of inserts 15 to form the generally flat, continuous body ply layup surface throughout the majority of the axial length of drum 5.

FIGS. 7 and 8 diagrammatically show run flat tires 20 produced by the body ply carcasses formed in FIGS. 3–4 and 6 respectively. As shown in FIGS. 7 and 8 the length of elastomeric inserts 15 is chosen so as to extend generally from the shoulder area of the tire to adjacent the bead area and with the distance D between the inboard ends 16 of sidewall inserts 15, being equal to the axial length of spacer 7.

In summary, spacer 7 which can be mounted or affixed in various manners at the center of cylindrical portion 10 of a usual expandable tire building drum, provides for a pair of adjacent recessed areas for receiving the pair of elastomeric inserts which will form the crescent shaped sidewall inserts of a run flat tire. Spacer 7, in combination with the outer surface of inserts 15, provide for a generally smooth, continuous ply receiving surface extending throughout the majority of the axial length of the tire building drum and circumferentially thereabout, which will properly space the sidewall inserts by the selected axial length of spacer 7, as well as the desired thickness of the sidewall inserts, which will be approximately equal to the height T of spacer 7. All of this can be accomplished relatively easily and inexpensively by forming spacer 7 from a plurality of arcuate segments which are attached by various types of fastening means to each of the individual segments 2 of a usual expandable segmented tire building drum.

While the preferred embodiments of the invention have been described above the invention is not limited thereto. The claims of the invention follow.

What is claimed is:

1. An improved first stage tire building drum having a continuous axially extending cylindrical central portion formed by a plurality of segments expandable in an outward direction and a pair of bead receiving areas adjacent said central portion for receiving bead rings about the drum upon outward expansion of said segments, wherein said improvement includes an annular spacer mounted on the continuous central portion of said drum, said spacer having a substantially smooth cylindrical outer surface with a radius greater than a radius of the cylindrical central portion of the drum forming a pair of spaced annular recessed areas adjacent the spacer for receiving a pair of elastomeric inserts thereon.

2. The tire building drum defined in claim 1 wherein each of the bead receiving areas is a generally U-shaped recess formed in the segments.

3. The tire building drum defined in claim 1 wherein the annular spacer is formed by a plurality of outwardly expandable arcuate segments.

4. The tire building drum defined in claim 3 wherein each of the outwardly expandable spacer segments has tapered edges.

5. The tire building drum defined in claim 1 including shaft means for rotating the drum.

6. In combination, a plurality of tire components including a pair of elastomeric inserts, an innerliner and at least one body ply for forming a first stage tire carcass for a run flat tire, and a tire building drum, said drum including a cylindrical center portion and a central annular spacer having a smooth cylindrical outer surface mounted on said center portion of the drum and forming a pair of recessed surfaces adjacent to said spacer, said spacer having a height substantially equal to the thickness of the elastomeric inserts which are mounted on said recessed surfaces, said inserts having substantially smooth outer surfaces which generally align with the outer surface of the spacer to provide a generally smooth continuous cylindrical ply layup surface for receiving at least the body ply thereon.

7. The combination defined in claim 6 including a pair of bead receiving grooves formed in the tire building drum outboard of the recessed surfaces for receiving beads therein.

8. The combination defined in claim 6 in which the innerliner is located between the body ply and the ply layup surface formed by the outer surface of the elastomeric inserts and outer surface of the central spacer.

9. The combination defined in claim 6 in which the central spacer terminates in a pair of downwardly outwardly tapered end edges.

10. The combination defined in claim 6 in which the innerliner is located between the elastomeric inserts and the spaced pair of recessed drum surfaces.

11. The combination defined in claim 6 in which the drum includes a plurality of arcuate segments.

12. A method of building a body ply carcass for a run flat tire comprising the steps of:

providing an expandable tire building drum having a cylindrical center portion and an annular spacer mounted on said center portion which provides a smooth central outer cylindrical surface and a pair of adjacent recessed insert receiving areas adjacent said spacer, and a pair of outer bead receiving areas;

placing an elastomeric insert, each having a generally smooth outer surface, in each of the recessed insert receiving areas whereby the central outer cylindrical surface of the spacer and outer surface of the pair of inserts form a generally smooth continuous ply receiving surface;

placing the innerliner over the spacer, insert receiving areas and bead receiving areas;

placing a body ply over the innerliner and ply receiving surface to create a generally straight smooth body ply carcass; and placing an annular bead in each of the bead receiving areas.

13. The method defined in claim 12 includes the step of placing the innerliner directly in contact with the ply receiving surface.

14. The method defined in claim 12 includes the step of placing the innerliner between the elastomeric inserts and the recessed insert receiving areas of the drum.

15. The method defined in claim 12 includes the step of providing the spacer with a radial height substantially equal to the maximum thickness of the elastomeric insert.

16. The method defined in claim 12 includes the step of providing the spacer with an axial width substantially equal to the distance between the inside edges of the elastomeric inserts.

17. The method defined in claim 12 includes the step of expanding the drum radially outwardly to secure the beads in the bead receiving areas.

* * * * *